United States Patent
Huang

(10) Patent No.: US 7,385,935 B2
(45) Date of Patent: Jun. 10, 2008

(54) IP ADDRESS PARAMETER SETTING METHOD OF REMOTE NETWORK APPARATUS

(75) Inventor: Ying-Hui Huang, Hsinchu (TW)

(73) Assignee: Alpha Networks Inc, Hsinchu (TW)

( * ) Notice: Subject to any disclaimer, the term of this patent is extended or adjusted under 35 U.S.C. 154(b) by 670 days.

(21) Appl. No.: 11/013,458

(22) Filed: Dec. 17, 2004

(65) Prior Publication Data
US 2006/0133288 A1   Jun. 22, 2006

(51) Int. Cl.
H04L 12/56 (2006.01)
H04L 12/26 (2006.01)
(52) U.S. Cl. ............ 370/252; 370/395.54; 370/401
(58) Field of Classification Search ............ None
See application file for complete search history.

(56) References Cited
U.S. PATENT DOCUMENTS 6,108,300 A * 8/2000 Coile et al. ............ 370/217
6,987,736 B1 * 1/2006 Horton ............ 370/248
2004/0162892 A1 * 8/2004 Hsu ............ 709/221
2006/0026289 A1 * 2/2006 Lyndersay et al. ............ 709/227

FOREIGN PATENT DOCUMENTS

JP    2006173877 A  *  6/2006

* cited by examiner

Primary Examiner—Chi H. Pham
Assistant Examiner—Soon-Dong D Hyun
(74) Attorney, Agent, or Firm—WPAT, P.C.; Justin I. King

(57) ABSTRACT

The present invention is to provide an IP address parameter setting method to prevent from setting incorrect parameter and interrupting the operation of a remote network apparatus when setting up the IP address parameter of the remote network apparatus again, which comprises the steps of activating a timer for time counting, enabling to receive a control confirmation of a control platform within a configured time and, if no control confirmation is received within the configured time, restoring the IP address parameter to a backup IP address parameter, allowing the control platform to manage the remote network apparatus and set up the address parameter of the remote network apparatus again.

2 Claims, 3 Drawing Sheets

IP ADDRESS PARAMETER SETTING METHOD OF REMOTE NETWORK APPARATUS

BACKGROUND OF THE INVENTION

1. Field of the Invention

The invention relates to an IP address parameter setting method of a remote network apparatus, more particularly to a method capable of preventing from setting incorrect parameter and interrupting the operation of the remote network apparatus when setting up the IP address parameter of the remote network apparatus again.

2. Prior Art of the Invention

For sake of correctly and smoothly transmitting and receiving data for each computer connected to Internet, each computer must have an address accordingly and this address is called Internet Protocol (IP) address. The IP address is just like a doorplate number for a computer and the packet data transmission is like the vehicles shuttling in the streets. Once IP address is known, then the equipment on the network knows to which computer the packet data go.

In general, the control of remote network apparatus is achieved by the point-to-point (between control platform and remote network apparatus) network packet data exchange. Therefore, the IP address parameter setup is closely associated with the network domain and IP address assignment management. If the IP address parameter of the remote network apparatus is set up improperly, it will invalidate the control functions of the remote network apparatus. Hence, the only resolution is that manager must attempt to reach the premise of the remote network apparatus and set up the correct IP address parameter again so as to possibly recover the control function of the remote network apparatus. In that way, it will be extremely inconvenient and lose the remote control function at all.

SUMMARY OF THE INVENTION

In consideration of the shortcomings of prior art, the inventor targets at the said shortcomings to develop various resolutions in accordance with his manufacturing experience and technique engaged in network devices. After continuous endeavor to research, experiment and improvement, it ends up with an IP address parameter setting method of remote network apparatus designed and developed in the invention in attempt to get rid off the shortcomings resulting from prior art.

One objective of the invention is to provide an IP address parameter setting method of a remote network apparatus to prevent from setting incorrect parameter and interrupting the operation of the remote network apparatus when setting up the IP address parameter of the remote network apparatus again. When the IP address parameter of the remote network apparatus is set up again, the remote network apparatus then sets up the original IP address parameter as the backup IP address parameter and further enables to receive the control confirmation of a control platform within the configured time upon activating a timer for time counting. Accordingly, if no control confirmation is received in the configured time, then restore the IP address parameter to the backup IP address parameter, making the control platform achieve the goal of managing the remote network apparatus again, setting up the address parameter of the remote network apparatus again and avoiding to interrupt the operation of the remote network apparatus.

The above and other objects, features and advantages of the present invention will become apparent from the following detailed description taken with the accompanying drawings.

DETAILED DESCRIPTION OF THE PREFERRED EMBODIMENTS

Figure 1:
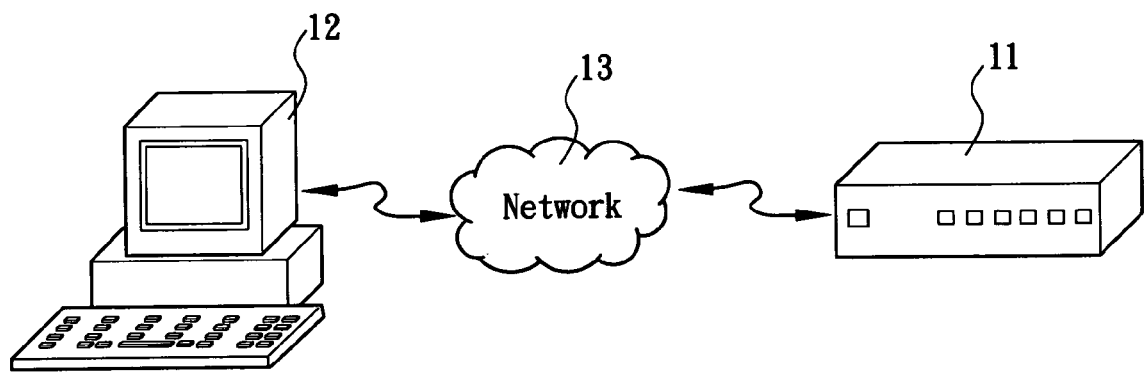
FIG. 1 is the illustrative view of the system of the invention.

The invention relates to an IP address parameter setting method of remote network apparatus. Please refer to what is shown in FIG. 1. The method is that the remote network apparatus 11 sets up the original Internet Protocol (abbreviated as IP) address parameter as the backup IP address parameter when setting up the IP address parameter of a remote network apparatus 11 and further enables to receive the control confirmation of a control platform 12 within the configured time upon activating a timer for time counting. Accordingly, if no control confirmation is received in the configured time, then restore the IP address parameter to the backup IP address parameter, making the control platform 12 manage the remote network apparatus 11 again, set up the address parameter of the remote network apparatus 11 again and thus prevent from setting incorrect parameter of the remote network apparatus 11 to interrupt the operation of the remote network apparatus 11.

Furthermore, please refer to what is shown in FIG. 1. The control platform 12 is a computer, which goes through the network 13 to connect with at least a remote network apparatus 11, enabling the control of these remote network apparatus to be achieved by virtue of point-to-point (between the control platform 12 and the remote network apparatus 11) network packet data exchange.

Figure 2:
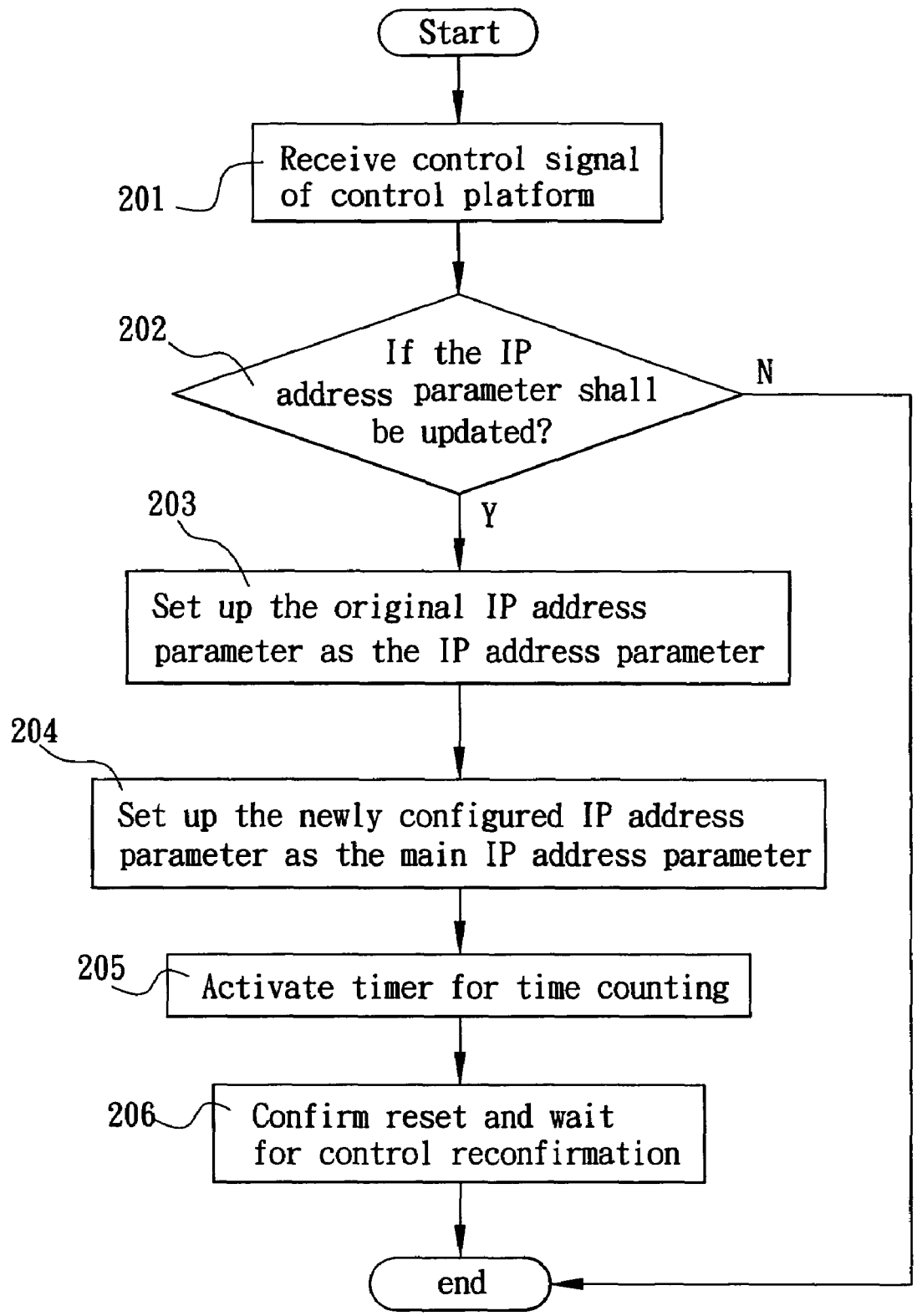
FIG. 2 is the action flow chart I of the invention.
Figure 3:
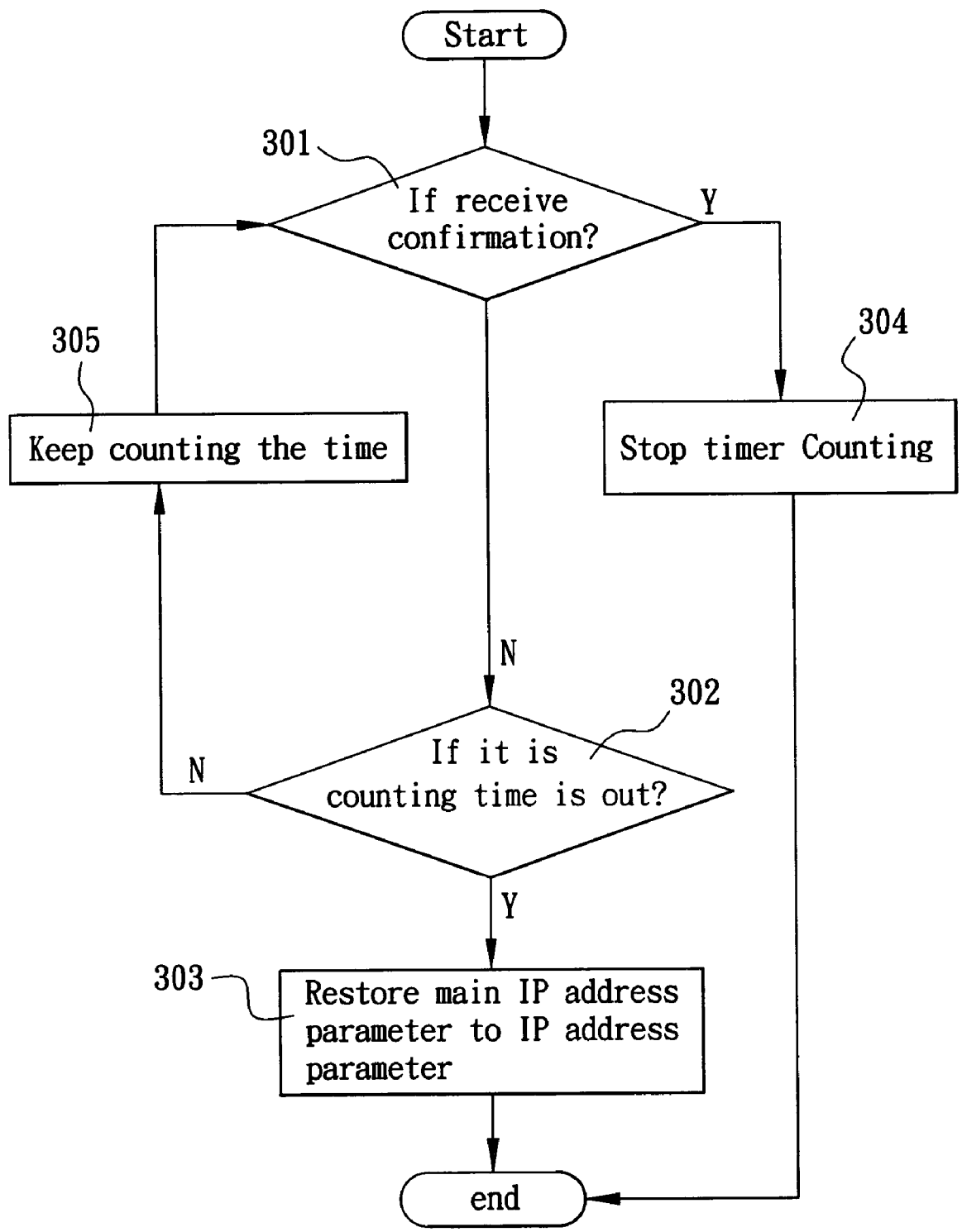
FIG. 3 is the action flow chart II of the invention.

When using the control platform 12 to set up the IP address parameters of these remote network apparatus again, please refer to what is shown in FIG. 2. These remote network apparatus 11 are processed based on the following procedures:

(201) Firstly, receive the control signal of the control platform 12;

(202) Determine if the command updating the IP address parameter is received from the control platform 12. If yes, proceed the next procedure (203); otherwise, terminate the procedures;

(203) Set up the original main IP address parameter as the backup IP address parameter;

(204) Set up the newly configured IP address parameter as the main IP address parameter;

(205) Activate a timer for time counting;

(206) Confirm reset to receive the control reconfirmation of the control platform and then terminate the procedures;

Moreover, when the IP address parameters of these remote network apparatus 11 is set up again and time counting is proceeding, please refer to what is shown in FIG. 3 and proceed processing according to the following procedures:

(301) Firstly, determine if network packet data for control confirmation transmitted by the control platform 12 is received. If yes, proceed procedure (304); otherwise, proceed the next procedure (302);

(302) Determine if it is time out regarding the time set up by the timer. If yes, proceed the next procedure (303); otherwise, proceed procedure (305);

(303) Restore the main IP address parameter to the backup IP address parameter so as to avoid the interruption of the control platform 12;

(304) Stop time counting of the timer and then terminate the procedures;

(305) Keep proceeding time counting and then proceed procedure (301);

According to the foregoing description, it is understood that the operation interruption of the remote network apparatus 11 resulting from the incorrect parameter setup can be avoided when the IP address parameter of the remote network apparatus 11 of the invention is set up again. As such, the control platform 12 can continuously keep setting up the address parameters of the remote network apparatus to attain the permanently uninterrupted remote control function.

While the invention has been described by means of specific embodiments, numerous modifications and variations could be made thereto by those skilled in the art without departing from the scope and spirit of the invention set forth in the claims.

What is claimed is:

1. An IP address parameter setting method of a remote network apparatus is that the remote network apparatus sets up an original IP address parameter as a backup IP address parameter when the IP address parameter of the remote network apparatus is set up again, which comprises the steps of:

activating a timer for time counting;
   enabling to receive a control confirmation of a control platform within a configured time and,
   if no control confirmation is received within the configured time, restoring the original IP address parameter to a backup IP address parameter and allowing the control platform to further manage the remote network apparatus and set up the address parameter of the remote network apparatus again.

2. The IP address parameter setting method of the said remote network apparatus of claim 1, wherein the control platform is a computer and the control platform goes through the network to mutually connect with at least a remote network apparatus, making the control of these remote network apparatus be attained by virtue of the point-to-point between the control platform and the remote network apparatus network packet data exchange.

* * * * *